July 9, 1957  R. W. HUND  2,798,451
PARKING STANCHION
Filed July 26, 1955

INVENTOR.
Ray W. Hund
BY
ATTORNEY.

United States Patent Office 2,798,451
Patented July 9, 1957

2,798,451

PARKING STANCHION

Ray W. Hund, Kansas City, Mo.

Application July 26, 1955, Serial No. 524,560

3 Claims. (Cl. 116—63)

This invention relates to the field of driver training and, more particularly, to a stanchion for use in teaching a novice driver how to park a vehicle properly.

During the teaching of persons just learning to drive an automobile, as well as the giving of advanced training to drivers for the operation of special vehicles, it is usually advisable that such training be given in a relatively open space in order to prevent damage to the vehicle and the trainee. However, in order for instruction in parking and various other maneuvers to be properly given, it is necessary to outline or simulate the extent and location of particular spaces or objects. For instance, in teaching a novice how to parallel park an automobile, it is desirable to mark off a parking space or area such as would be presented between a pair of other vehicles when actually parked on a street. Prior devices for such purpose have been subject to various disadvantages such as being of nature as to either be broken and rendered unusable until repaired when contacted by a vehicle improperly manipulated by a trainee or of a nature such as to damage the vehicle being used by a trainee upon impact of the vehicle with the device. Moreover, such prior types of devices have usually been unnecessarily complex or bulky rendering them both expensive to manufacture and difficult to transport in numbers such as are commonly required in use for marking off various spaces of a field or area being used for driver training purposes.

Accordingly, it is the primary object of this invention to provide an improved parking stanchion overcoming all of the above mentioned and other disadvantages of prior devices intended for the same general purpose.

Another important object of this invention is to provide such a stanchion which is simple in form, and therefore, convenient to use and inexpensive to manufacture.

Another important object of this invention is to provide such a stanchion which is adapted for being collapsed to a condition occupying little space during transportation, but which may be easily and quickly set up and releasably locked in operative condition.

Another important object of this invention is to provide such a stanchion incorporating therein a normally upright marker element held in place upon a base by spring means adapted to permit the element to swing from its normal position upon contact with a vehicle, thereby preventing or minimizing damage to the vehicle upon impact with the element of the stanchion.

Other important objects of this invention, including certain important details of construction, will be made clear or become apparent as the following specification progresses.

Figures 1, 2, 3:
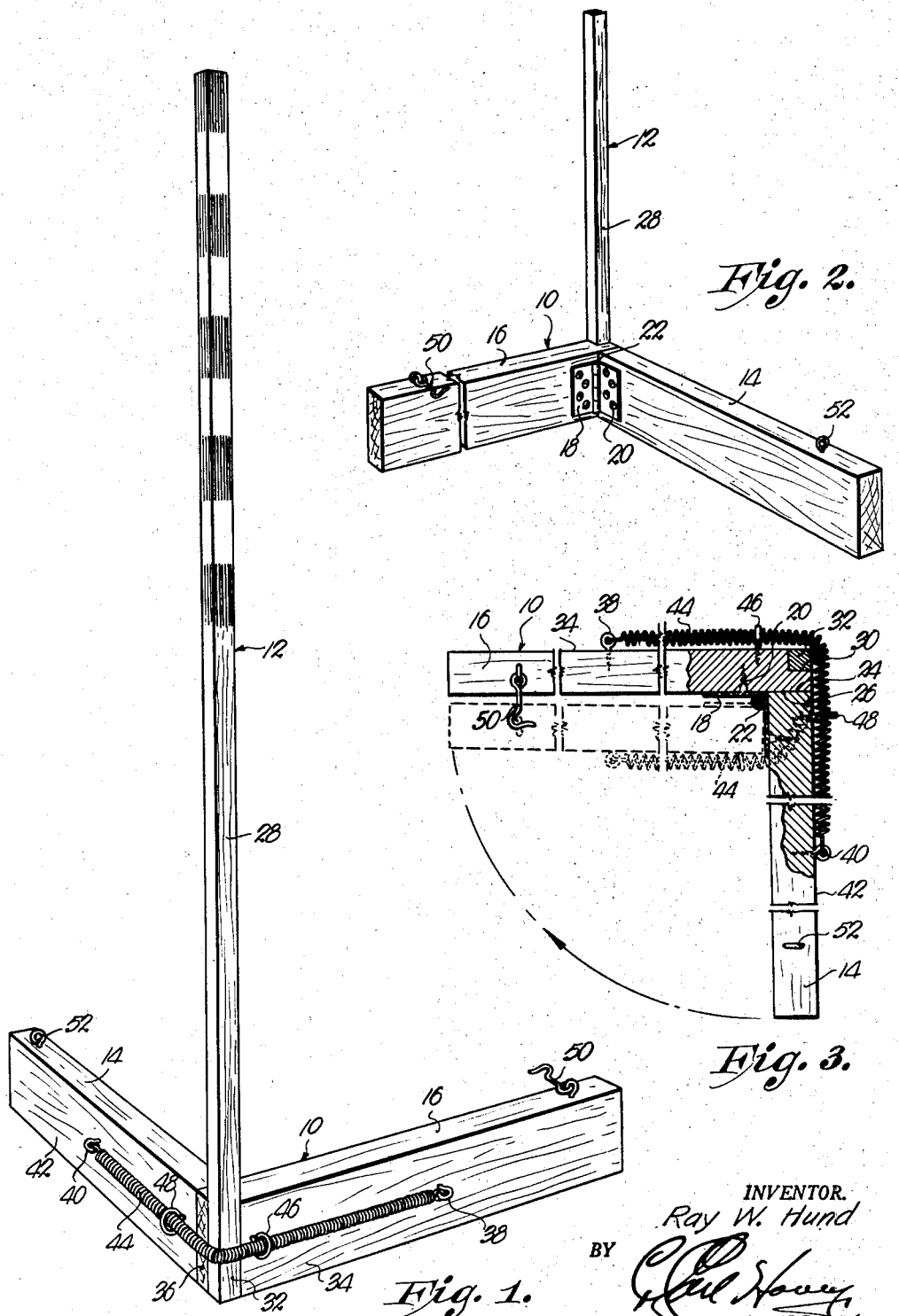
Figure 1 is a perspective view of a stanchion made in accordance with this invention.
Fig. 2 is a perspective view of the stanchion shown in Fig. 1, taken from the opposite side thereof.
Fig. 3 is a top plan view showing the stanchion in solid lines in operative condition and in dotted lines in condition for storage or transportation, parts being broken away and shown in section for clarity of illustration.

Referring now to the drawing, the stanchion will be seen to include a base broadly designated 10 and a normally upright, marker element broadly designated 12. Base 10 may preferably be formed of a pair of elongated members 14 and 16 swingably interconnected by a hinge 18 fastened to the members 14 and 16 adjacent respective ends thereof by screws or the like 20. Actually, the hinge 18 is so located upon the members 14 and 16 that a pivot pin 22 forming a part of the hinge 18, and therefore the axis of relative swinging movement between members 14 and 16, is located substantially at an end of the member 14 and spaced from an end of the member 16 a distance necessary to accommodate the thickness of member 14, in order that, when the stanchion is in operative condition, the end of member 14 designated 24 may abut against the face portion designated 26 of member 16.

The marker element 12 obviously comprises a straight, elongated piece 28 of preferably square transverse cross-section. It may be pointed out that members 14 and 16 may be conveniently formed of 2" x 4" lumber with the member 16 being about 20" long and the member 14 about 18" long, while the element 12 may comprise a piece 28 of 1" x 1" lumber of any suitable length, for instance, about 48".

An upright groove of square cross-section is designated 30 and is cut away from the outside corner of member 16 at the end thereof adjacent the hinged connection with member 14. Groove 30 is of cross-section and dimension adapted to receive a lower stretch 32 of element 12 in complemental fashion such that two of the exterior longitudinal faces of stretch 32 abut against the surfaces of member 16 defining the groove 30, while the other two exterior, longitudinal faces of the element 12 are flush with the exterior face 34 and the end face 36 respectively of member 16.

Member 16 is provided with a screw eye 38 secured to face 34 thereof intermediate the ends thereof, while member 14 is provided with a screw eye 40 secured upon a corresponding face 42 of the member 14 intermediate the ends thereof. An elongated coil type spring, which may be of the variety commonly used on screen doors, is designated 44 and has its ends respectively secured in eyes 38 and 40. The spring 44 thus extends around the corner of member 16 having groove 30 therein. A pair of larger screw eyes 46 and 48 are respectively secured to members 16 and 14 on faces 34 and 42 thereof, and the spring 44 is passed through each of said eyes 46 and 48, which function as guides for maintaining the spring 44 in the desired position.

It will now be clear that the spring 44 is adapted to perform two functions in connection with the operation of the stanchion. First, the spring 44 tends to normally move the members 14 and 16 to their operative condition of relative positioning, as shown in solid lines in Fig. 3, and to yieldably maintain the members 14 and 16 in such condition. Secondly, the spring 44 is adapted to engage the stretch 32 of element 12 when the latter is within the groove 30 of member 16 in such manner as to yieldably hold the element 12 within groove 30, and therefore, in upright disposition.

A swingable hook 50, which may be of the kind normally used in connection with screen doors, is secured upon the member 16 adjacent the end of the latter remote from the hinge 18. A hook-receiving eye 52 adapted to cooperate with hook 50 is secured upon the member 14 adjacent the end of the latter remote from the hinge 18. Since the element 12 has its stretch 32 held within groove 30 of member 16 only by the yieldable engagement therewith of spring 44, it will be clear that the element 12 may be conveniently removed from the base 10 and the latter then placed in a condition for transportation or storage by swinging the member 14 in the direction indicated by the arrow in Fig. 3 until the dotted line position illustrated in such Figure is attained. The member 14 may then be locked in such relative disposition by engagement of the hook 50 with the eye 52.

In operation, assuming the stanchion is in the storage or transportation condition in which members 14 and 16 are disposed as shown in dotted lines in Fig. 3 and are locked in such condition by the hook 50, and further assuming that the element 12 has been removed from the member 16 during such storage or transportation, as will normally be the case, the stanchion may be placed in operation by releasing the hook 50 from eye 52, whereupon the spring 44 will swing the members 14 and 16 to their operative relationship for presenting a stable base 10. The element 12 may then be installed in its normally upright condition upon base 10 by fitting the stretch 32 within groove 30 and with the spring 44 in overlying relationship.

The stanchion may then be emplaced upon the training field, along with other stanchions of like character, to mark out a particular area to be avoided by the student driver. In learning to park or the like, the student driver may inadvertently fail to fully avoid such area with his vehicle so that the latter will come in contact with the upright element 12 of one or more of the stanchions. When this occurs, it will be clear that the element 12 is free to swing against the yieldable holding action of spring 44 upon stretch 32 in any direction that may be necessary to avoid serious damage to the vehicle. In the event that the vehicle of a student contacts an element 12 with unusual force, the element 12 will actually dislodge itself from the base 10 without serious damage to the vehicle.

It should now be apparent that the structure contemplated by this invention is ideally adapted for the accomplishment of all of the above stated objectives. It is particularly significant that the stanchion of this invention not only prevents damage to a vehicle while being manipulated by a student driver, but also prevents any serious damage to the stanchion itself, so that the latter may be used over and over again without the necessity for any substantial maintenance or repair.

Manifestly, certain minor modifications or changes could be made from the exact structure disclosed for purposes of illustration without departing from the true spirit or intention of the invention. Accordingly, it is to be understood that the invention shall be deemed limited only by the scope of the appended claims.

Having thus described the invention, what is claimed as new and desired to be secured by Letters Patent is:

1. A stanchion for training drivers in the art of parking vehicles comprising a ground engaging base having an upright groove therein; an elongated marker element normally in engagement with the base within said groove; and a spring on the base passing over the element and in engagement therewith opposite said groove for yieldably holding the element in the groove and in an upright, normal position.

2. A stanchion for training drivers in the art of parking vehicles comprising a pair of elongated members; hinge means swingably and directly interconnecting the members with each other at one end of each of the latter, presenting a collapsible, ground engaging base; an elongated marker element; and yieldable means for releasably mounting the element in normally upright disposition on one of said members.

3. A stanchion for training drivers in the art of parking vehicles comprising a pair of elongated members; hinge means swingably and directly interconnecting the members each other at one end of each of the latter for relative movement between a collapsed condition in which the members are disposed in side by side relationship and an operative condition in which the members are angled from each other at approximately a right angle to present a ground engaging base, there being an upright groove in one of said members adjacent said one end thereof; an elongated marker element normally in engagement with said one member within said groove thereof; and an elongated, extensible spring having an end secured to each of said members respectively, said spring being under tension to swing said members to said operative condition when the latter are released, said spring extending around the element in engagement therewith oppositely to the groove to yieldably maintain the element in the groove and in an upright, normal position.

References Cited in the file of this patent
UNITED STATES PATENTS

| | | |
|---|---|---|
| 1,232,963 | Parkins | July 10, 1917 |
| 2,650,052 | Bintz | Aug. 25, 1953 |